US012277950B2

(12) United States Patent
Weng

(10) Patent No.: US 12,277,950 B2
(45) Date of Patent: Apr. 15, 2025

(54) METHODS FOR CLEAR CALL UNDER NOISY CONDITIONS

(71) Applicant: Fuliang Weng, Mountain View, CA (US)

(72) Inventor: Fuliang Weng, Mountain View, CA (US)

(73) Assignee: Fuliang Weng, Mountain View, CA (US)

( * ) Notice: Subject to any disclaimer, the term of this patent is extended or adjusted under 35 U.S.C. 154(b) by 0 days.

(21) Appl. No.: 17/544,900

(22) Filed: Dec. 7, 2021

(65) Prior Publication Data

US 2022/0180886 A1 Jun. 9, 2022

Related U.S. Application Data

(60) Provisional application No. 63/122,531, filed on Dec. 8, 2020.

(51) Int. Cl.
*G10L 21/0208* (2013.01)

(52) U.S. Cl.
CPC ................................ *G10L 21/0208* (2013.01)

(58) Field of Classification Search
CPC ................................................... G10L 21/0208
See application file for complete search history.

(56) References Cited

U.S. PATENT DOCUMENTS

| | | | | |
|---|---|---|---|---|
| 7,676,372 B1 * | 3/2010 | Oba | G10L 21/0364 704/271 |
| 2011/0313762 A1 * | 12/2011 | Ben-David | G10L 13/08 704/270.1 |
| 2014/0029762 A1 * | 1/2014 | Xie | H04R 5/027 381/94.1 |
| 2016/0239084 A1 * | 8/2016 | Connor | A61B 5/6803 |
| 2018/0075844 A1 * | 3/2018 | Kim | G10L 15/065 |
| 2018/0084341 A1 * | 3/2018 | Cordourier Maruri | H04R 3/00 |
| 2019/0045298 A1 * | 2/2019 | Klemme | G10L 21/0208 |
| 2020/0051583 A1 * | 2/2020 | Wu | G10L 13/047 |
| 2020/0184996 A1 * | 6/2020 | Steele | H04R 1/1083 |
| 2022/0013106 A1 * | 1/2022 | Deng | G10L 13/08 |

* cited by examiner

*Primary Examiner* — Daniel R Sellers
(74) *Attorney, Agent, or Firm* — Bo-In Lin

(57) ABSTRACT

This invention provides a new and improved voice communication system with high quality noise cancellation method and devices to overcome the limitations and difficulties encountered in conventional technologies. This invention discloses a noise cancellation apparatus that includes a vibration sensor and a microphone for receiving and transmitting voice signals as incoming speeches. The vibration sensor is applied to receive vibration signals corresponding to the voice signals for applying the vibration signals as reference signals for removing noise signals generated from environmental noises by converting vibration signals to intermediate PDL representation together with the speaker characteristics, mapping them into full band high quality clean acoustic representation, and synthesizing clear personal speech with characteristics identical to the original microphone speech without noises.

15 Claims, 19 Drawing Sheets

Fig. 1 :Key Idea – Speech Recovering Flow
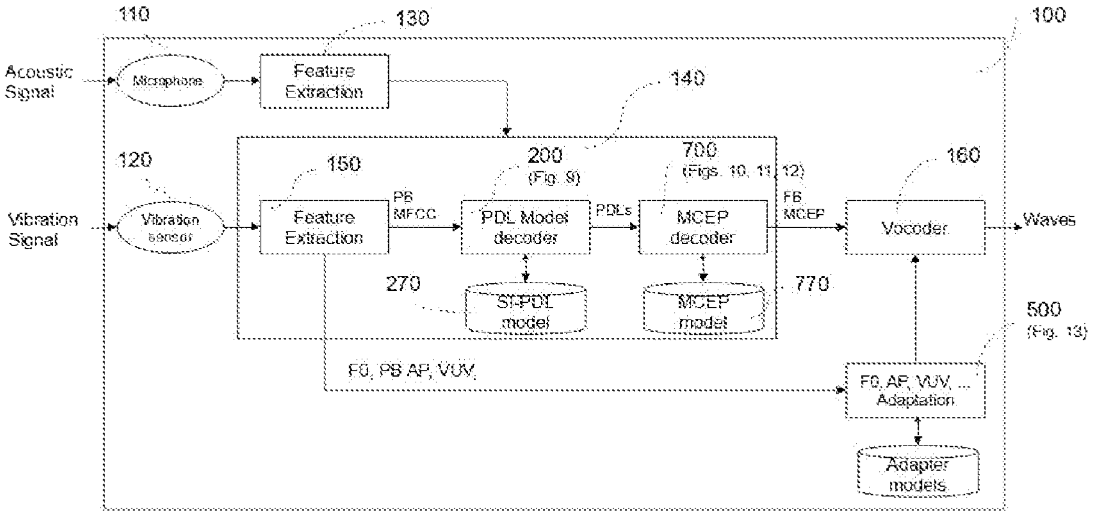

Fig. 2: Key Ideas – Variation A
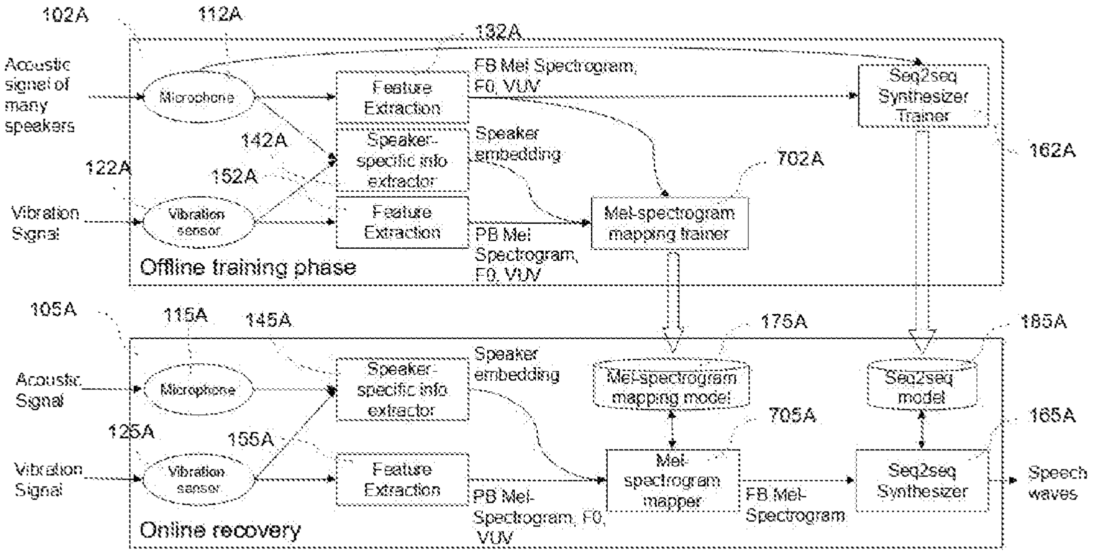

Fig. 3: Recovering Flow – Variation A
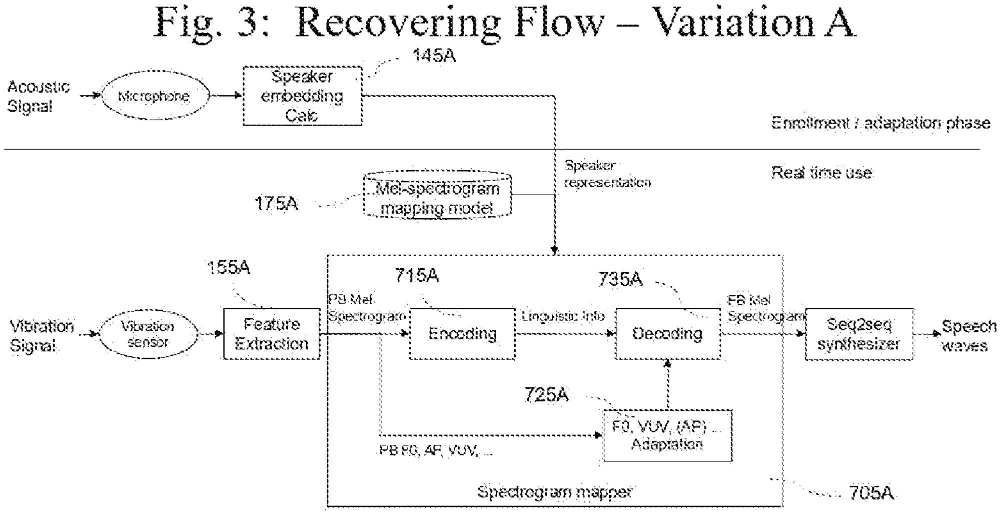

Fig. 4: Key Ideas – Variation B
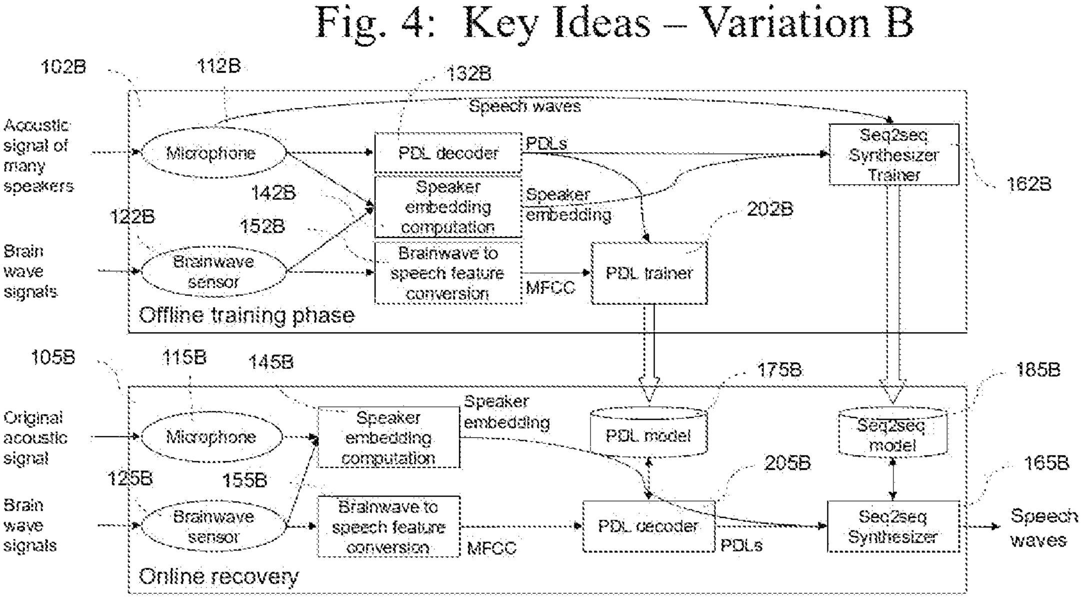

Fig. 5: HW System Setup Diagrams
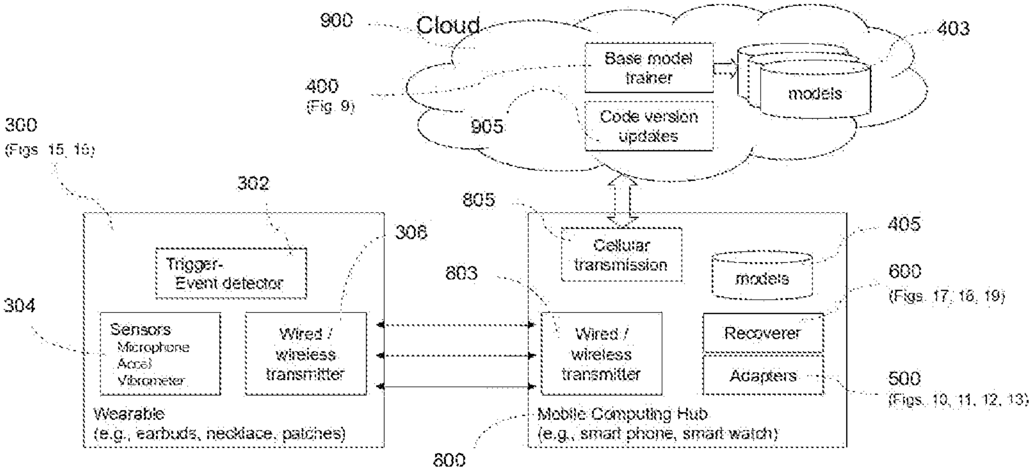

Fig. 6: HW System Setup Diagrams – Lean Hub
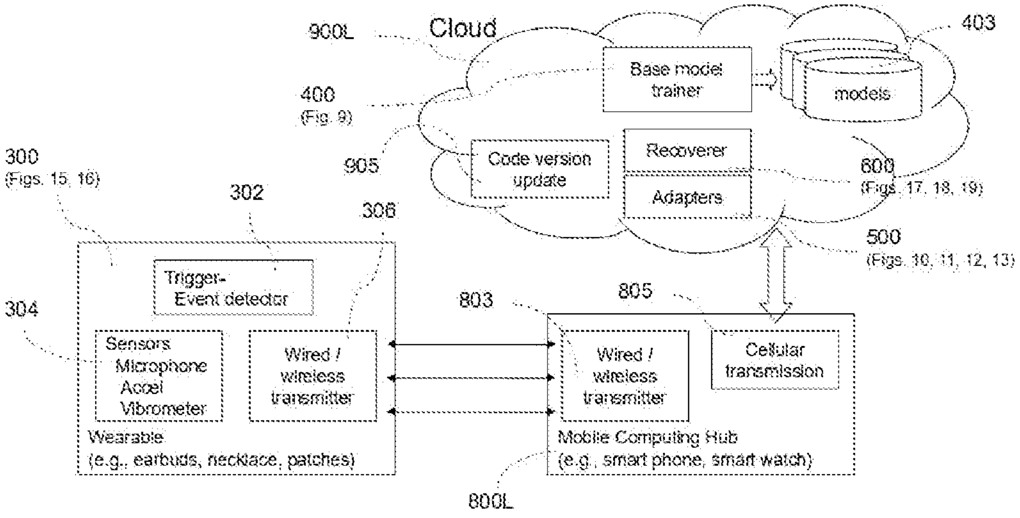

Fig. 7: Earbud-based System Setup Diagrams
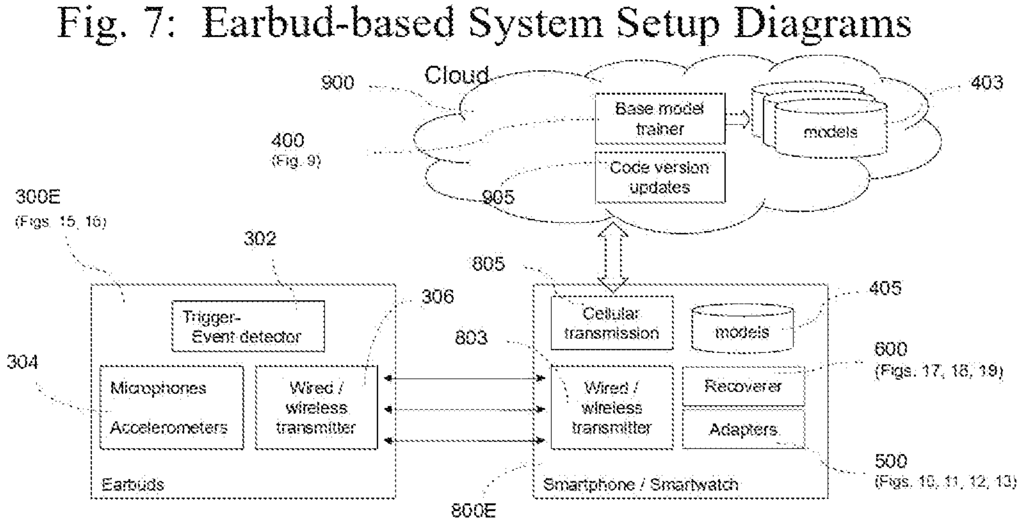

Fig. 8: Earbuds-based – Lean Hub
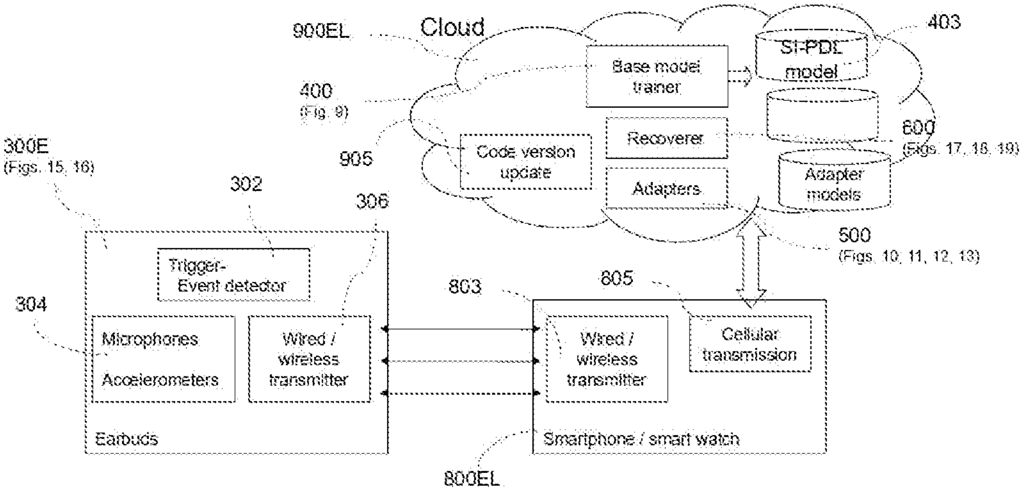

Fig. 9: Software System Diagrams - I
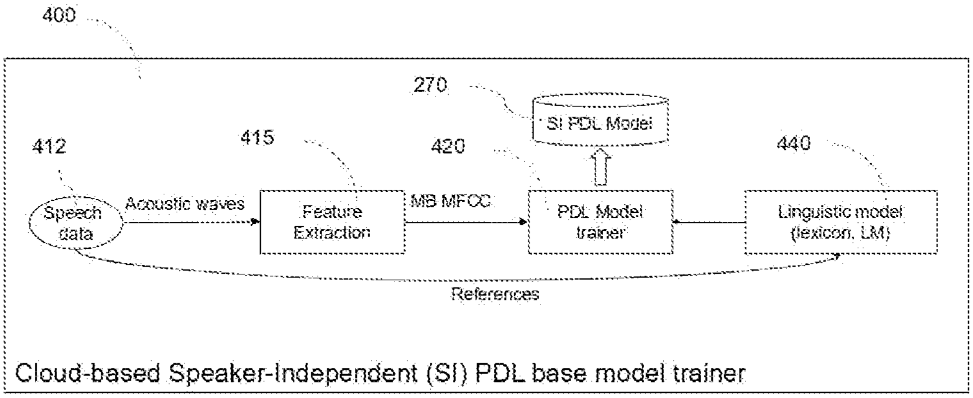

Fig. 10: Software System Diagrams - II
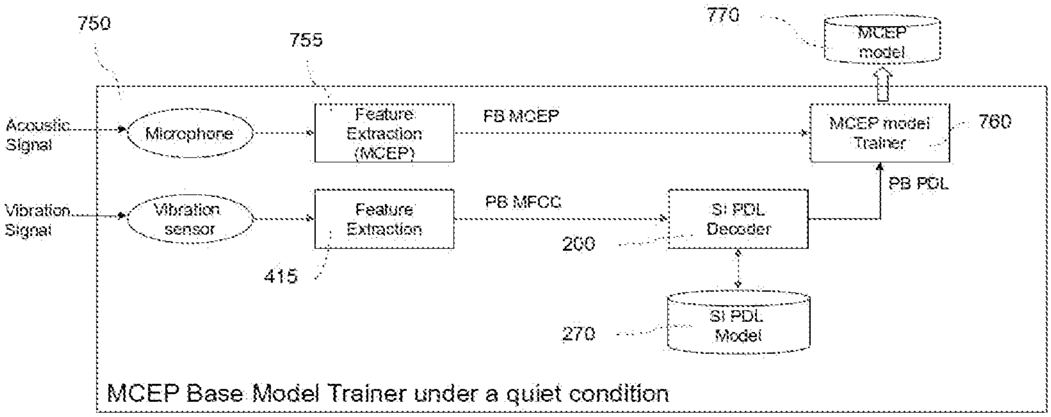

Fig. 11: Software System Diagrams – $II_b$
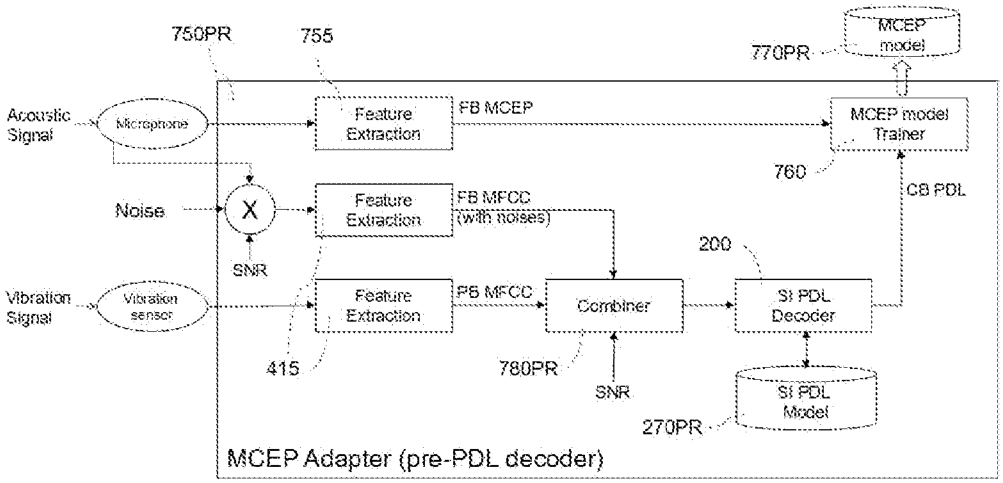

Fig. 12: Software System Diagrams - $II_c$
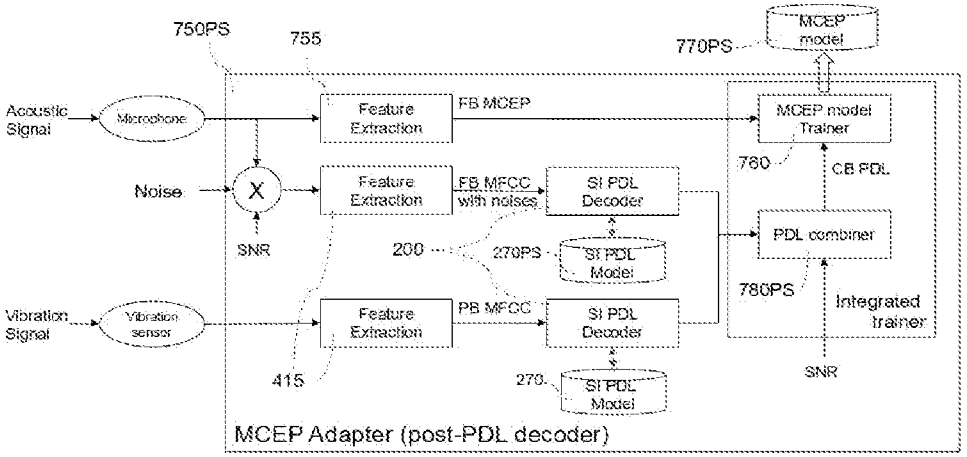

Fig. 13: Software System Diagrams - III
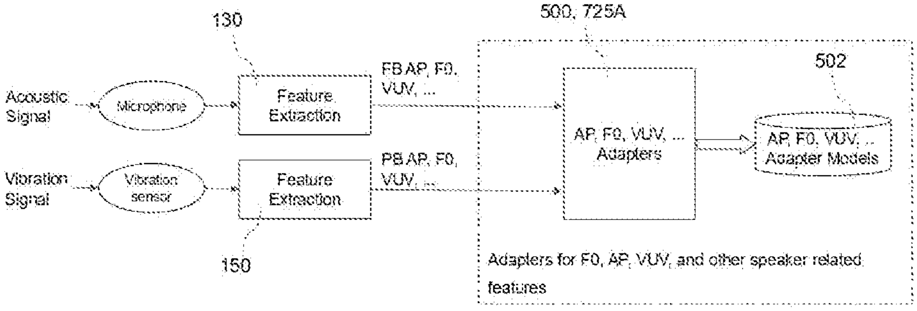

Fig. 14: Software System Diagrams – $III_{b,c}$
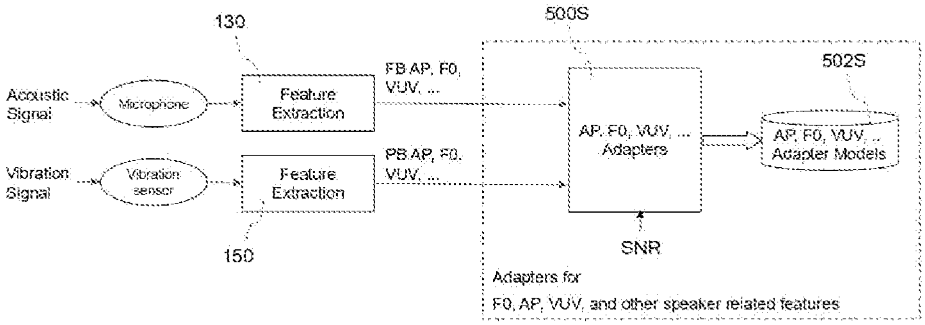

Fig. 15: Base Event Trigger Diagrams - IV
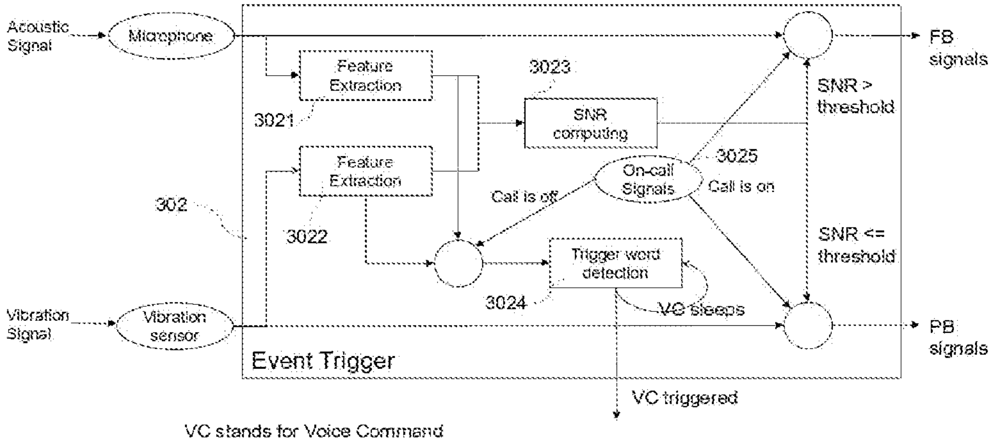

Fig. 16: Event Trigger Variant Diagrams – $IV_{b,c}$
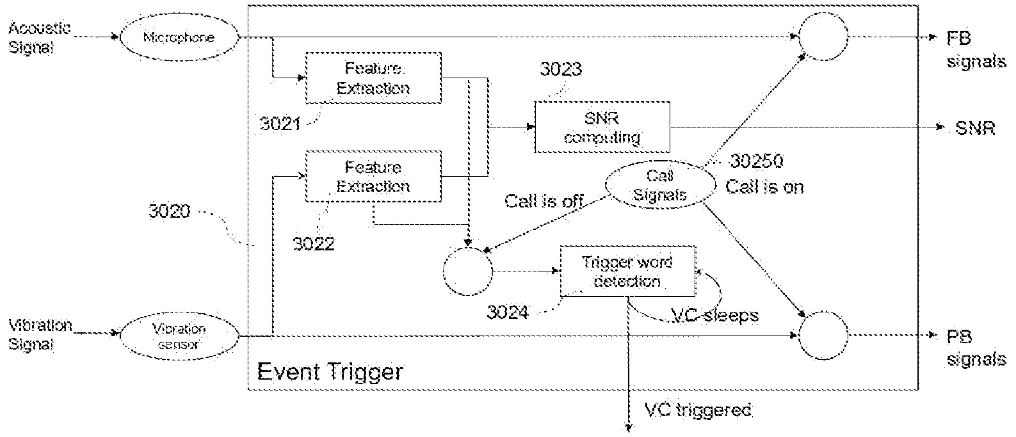

Fig. 17: Base Recoverer Module Diagrams - V
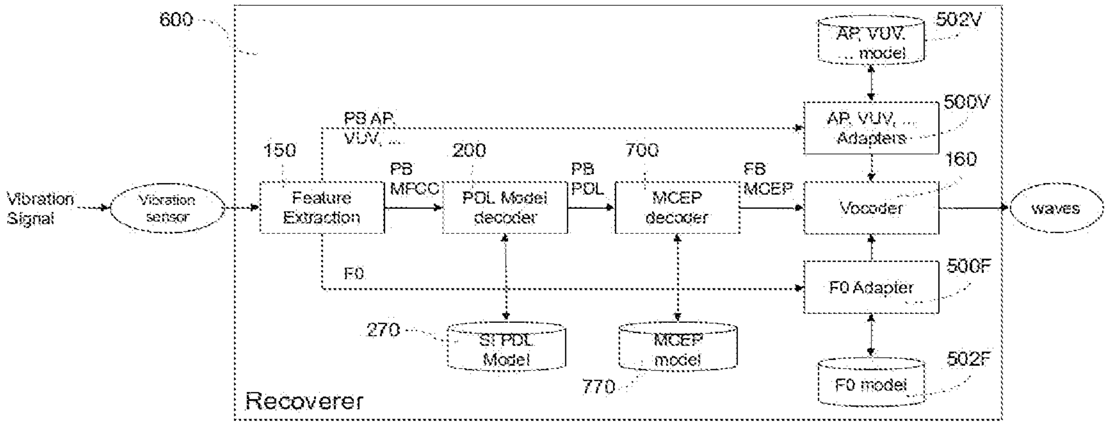

Fig. 18: Recoverer Module Variant Diagrams - $V_b$
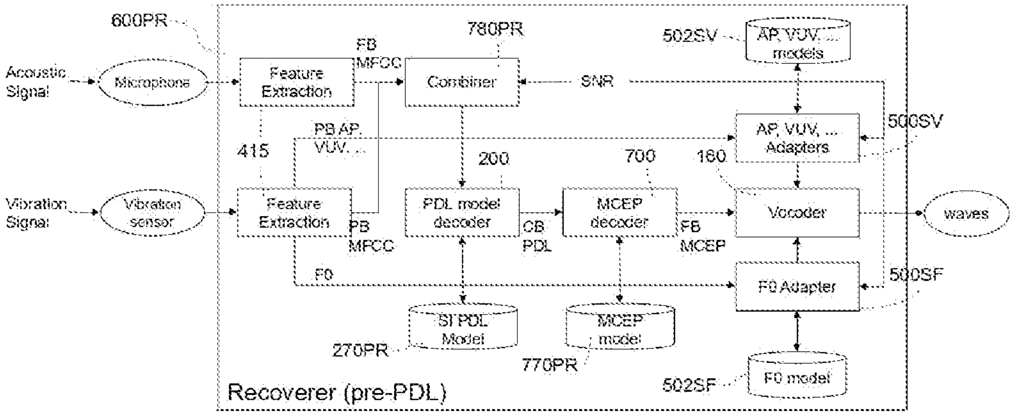

Fig. 19: Recoverer Module Variant Diagrams - $V_c$
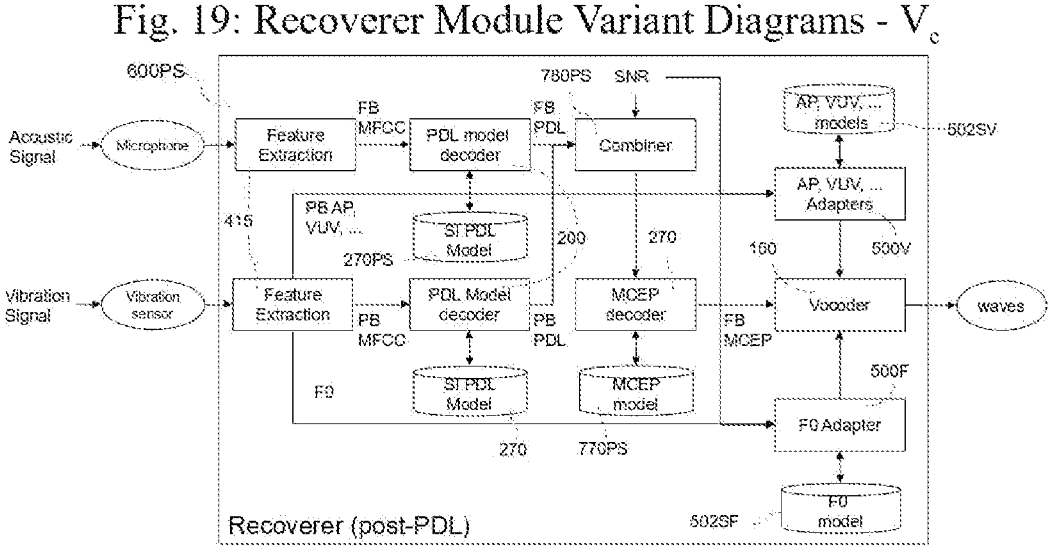

METHODS FOR CLEAR CALL UNDER NOISY CONDITIONS

TECHNICAL FIELD

This invention relates generally to systems and methods for providing high quality wireless or wired communications. More particularly, this invention relates to systems and methods for providing clear voice communications under noisy conditions.

BACKGROUND OF THE INVENTION

Conventional technologies for voice communications are faced with a challenge due to the facts that wireless or wired communications, e.g., cellular phone calls, are often carried out in a noisy environment. Common experiences of such phone calls may occur when people are walking on the street, riding in a subway, driving on a noisy highway, eating in a restaurant or attending a party or an entertainment event such as a music festival, etc. Clear communications under those noisy circumstances are often difficult to realize.

Recent technical developments also enable hand-free communications. However, hand-free wireless communication also faces the same challenges to achieve clear communications under the noisy circumstances. For these reasons, noise cancellations become an urgent challenge and there are many conventional technical solutions in attempt to overcome such difficulties. These techniques, including beam forming, statistical noise reduction, frequency-bin filtering, deep learning-based noise cancellation using a large amount of data recorded under different noisy environments, etc. However, these techniques can generally effectively and reliably operate to cancel stationary or known noises. Clear and noise free communications are still not achievable under most circumstances since most of the wireless communications often occur in noisy environments where the noises are not stationary nor known in advance but are changing dynamically, especially under the situations of very low signal and noise ratio (SNR). Therefore, an urgent need still exists in the art of voice communications to provide effective and practical methods and devices to cancel noises for daily wireless communications.

SUMMARY OF THE INVENTION

It is therefore an aspect of the present invention to provide a new and improved noise cancellation system implemented with new devices and methods to overcome these limitations and difficulties. Specifically, the noise cancellation system includes wearable devices with a vibration sensor and microphones to detect and track speech signals. In one of the embodiments, the vibration sensors include MEMS accelerometers and piezoelectric accelerometers for installation in earbuds, necklaces, and patches directly on the upper body such as on the chest for detecting vibrations. In another embodiment, the vibration sensor may be implemented as a laser-based vibration sensor, e.g., vibrometer, for non-contact vibration sensing. The wearable device also includes a wireless transmitter/receiver to transmit and receive signals. The clear voice recovery system further includes a converter to convert the vibration sensor and/or microphone sensor signals to a probabilistic distribution of linguistic representation sequences (PDLs) by using a rapidly adapted recognition model. The PDLs are then mapped into a full band MCEP sequence by applying a mapping module that is first developed and trained during the adaptation phase. The clear personal speech to be transmitted to the other parties through the wireless communication is recovered by a vocoder using the full band MCEPs, aperiodic features (AP), Voiced/Unvoiced (VUV), and F0.

Alternatively, the speaker's unique features in the form of embedding are used together with the vibration sensor signals to convert from the vibration signals to the full band Mel-spectrogram of the speech from that speaker. The speaker's clear speech is then recovered from the full band Mel-spectrogram using a seq2seq synthesis trained offline with many different speakers. The conversion from the vibration sensor signals and the speaker features to the full band Mel-spectrogram is trained during the adaptation phase.

The vibration sensor signals are not affected by the noises one would encounter in our daily life. The new and improved systems and methods disclosed in this invention are therefore robust for application under any type of nosy environment with intelligibility, requiring only a few minutes of input speech of the user voice during an enrollment mode or an actual use under a quiet condition. The systems and methods disclosed in this invention are further implemented with flexible configurations to allow different modules to reside in different nodes of the wireless communication including wearable, computing hub, e.g., smartphone, or in the cloud.

Additional embodiments for broader cases of noise-removal tasks beyond earbuds may use an accurate far-field automated speech recognition engine (FF-ASR) for noisy conditions and/or reverberant environment. The FF-ASR translates the speaker's voice into PDL which is then converted by the rest of the system to a clean voice of the same speaker for various online communication or offline noise-removal of speech recordings.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 shows the key ideas for the speech recovering flow.

FIG. 2 shows the key ideas, of Variation A, for the speech recovering flow.

FIG. 3 shows additional recovery flow ideas, of Variation A.

FIG. 4 shows additional recovery flow ideas, of Variation B.

FIG. 5 is a diagram to illustrate the hardware system setup.

FIG. 6 is a diagram to illustrate the hardware system setup as a lean-hub.

FIG. 7 is a diagram for showing an earbud-based system setup.

FIG. 8 is a diagram for showing an earbud-based system setup as a lean-hub.

FIG. 9 is a diagram for showing the software system as variation I embodiment.

FIG. 10 is a diagram for showing the software system as variation II embodiment.

FIG. 11 is a diagram for showing the software system as variation IIb embodiment.

FIG. 12 is a diagram for showing the software system as variation IIc embodiment.

FIG. 13 is a diagram for showing the software system as variation III embodiment.

FIG. 14 is a diagram for showing the software system as variation IIIbc embodiment.

FIG. 15 is a diagram for showing the software system as variation IV embodiment.

FIG. 16 is a diagram for showing the software system as variation IVbc embodiment.

FIG. 17 is a diagram for showing the software system as variation V embodiment.

FIG. 18 is a diagram for showing the converter software module as variation Vb embodiment.

FIG. 19 is a diagram for showing the converter software module as variation Vc embodiment.

DETAILED DESCRIPTION OF THE INVENTION

The present invention will be described based on the preferred embodiments with reference to the accompanying drawings.

FIG. 1 is a process flow diagram that illustrates the key ideas of the speech recovering flow wherein hardware and software processes components are implemented to complete these recovering processes. The speech recovering flow as shown in FIG. 1 enables a reliable noise-robust high-quality voice solution for wearable devices, such as earbuds, necklaces, and patches. The process flow as shown further leverages the signals from microphones, accelerometers, and other sensors to detect & track speech signals. In FIGS. 1, different kinds of vibration or signal collecting sensors may be implemented to provide effective noise cancellation includes a laser based vibration sensor (vibrometer) for non-contact applications, Electrocorticography (ECOG), Electroencephalography (EEG), and N1 from Neuralink. The vibration sensors may be installed in the earbuds, necklace, patches attached to the upper body such as attached on the chest, while ECOG, EEG, and N1 may be attached or implanted to the head. The wearable devices incorporate a wireless transceiver to receive and transmit signals between the wearable devices and the computing hub as illustrated in FIG. 5-8 (to be detailed later). In the process flow as shown, the original signals from the other sensor(s) are converted into a speaker-independent intermediate linguistic representation (PDL), such as phonetic posteriorgram sequences (PPGs) and grapheme distribution sequences, via offline trained and adapted models. The offline training process to obtain the intermediate linguistic representation is called the offline training phase, and both speech data from the microphone(s) under quiet conditions and the vibration signal data are used for training the conversion models, which are similar to speech recognition models. The converted PDLs are then mapped into a full band MCEP sequence with the mapping model trained during the adaptation phase. The speech with personal characteristics of the speaker wearing the devices is then recovered by using the full band MCEPs, aperiodic features (AP), Voiced/Unvoiced (VUV), and F0s. The recovering happens in real time during the communication, and is called the recovering phase. The recovered speech sounds just like speech directly from that speaker. The process as shown is robust to any types of noises with high intelligibility, requiring only a few minutes of input speech of the user voice during an enrollment mode under a quiet condition, called technically as the adaptation phase. The quiet condition is measured by the signal to noise ratio (SNR) as described later in the document. The enrollment mode or adaptation phase can be made explicit to the user in the beginning of the device use, or implicitly when the environment meets certain requirements, such as SNR level above a pre-set threshold. During the use of the wearable devices, the signals with speech sensed by the microphones on the earbuds can be blocked from sending to the other parties directly when certain types of background noises are detected, and the signal created by the user when speaking can still go through the vibration sensors and the other parties can hear the talker's speech with this method as if the user talks directly to the other parties.

Furthermore, in a background blocking mode, the earbuds can be designed to block the background sounds so that the user can hear the sound (voice, music, etc.) from the other parties through the communication channel via the sound speaker in the wearable device such as earbuds. The background sound blocker can be done mechanically or algorithmically. Specifically, the mechanical blocker may be implemented as adaptive rubber buds to fit to the ear openings and canals of each individual person, and the algorithmic blocker may be implemented using an active noise cancellation algorithm.

In a semi-transparent mode when the speaker intends to provide reduced background sounds to the hearers, one may mix the background sounds of a reduced volume set by the earbud user with the synthesized speaker's voice.

In any of its operating modes, an acoustic echo cancellation module is always incorporated to prevent the sounds of the other parties through the communication channel from getting into the microphones, accelerometers, and other vibration sensitive sensors, as one would normally do in other earbud implementations.

The process flow as shown in FIG. 1 can therefore be flexibly implemented with different configurations that will be further described below to allow different modules located in different nodes in the communication networks across wearable devices, computing hubs (e.g., smartphone, smart watch), or servers on the cloud.

Specifically, Processing step 100 is a speech recovering flow, which takes the microphone and vibration sensor inputs and recovers speech via synthesis without noises Processing step 110 is one or more microphones that sense acoustic waves and convert them into a sequence of digital values. It is typically an air conduction microphone. It is also used for deciding the signal noise ratio calculation (Processing step 3023) together with Processing step 120.

Processing step 120 is a vibration sensor that senses the vibration signals on contact and converts them into a sequence of digital values. Often, it is a bone conduction sensor.

Processing step 110 and processing step 120 sense the signals in a synchronized way with marked time stamps. They are used in an offline training phase (Processing step 400), an adaptation phase (Processing step 750, 750PR, 750PS), and real time recovery phase (Processing step 600, 600PR, 600PS).

Processing step 130 and Processing step 150 are the same feature extraction module. They take a sequence of digital signal values, analyze them, and produce one or more sequences of feature vectors. The feature vectors can be Mel-Frequency Cepstral Coefficients (MFCCs). Specifically, Processing step 130 takes the input from the microphone and Processing step 150 takes the input from the vibration sensor.

Processing step 140 contains three modules Processing step 150, Processing step 200, and Processing step 700 that takes the input from the vibration sensor and the output features from Processing step 130 to generate speaker-independent full band Mel Cepstral Features (MCEP). Processing step 200 takes input from the output of Processing step 150 and optionally the output from Processing step 130 and produces a sequence of probabilistic vectors with the form of a speaker-independent PDL representation (e.g., PPG) such as phonetic piece vectors, grapheme vectors, or word piece vectors, based on a pre-trained model in processing step 270.

Processing step 700 takes the phonetic representation from Processing step 200 and generates a sequence of a full band MCEP, based on a model in processing step 770 trained during the adaptation phase. Variations are given in FIGS. 10, 11, and 12.

Processing step 500 takes the output from Processing step 150, partial band speaker-dependent features, including F0, Aperiodic (AP), Voiced/Unvoiced info, of vibration signals, and adapts them into corresponding full band features. Training details are given in FIG. 13.

Processing step 160 is the vocoder that takes the speaker-independent features from Processing step 700 in combination with the speaker-dependent features from Processing step 500 to generate speech wave signals.

FIGS. 2 and 3 show an embodiment of this invention implemented as variation type A to achieve the speech recovery. As briefly described above, the whole speech recovery processes include an offline training phase, an online or offline adaptation phase, and an online recovery phase. During the offline training phase, a sequence to sequence (se2seq) conversion model is trained with speech Mel-spectrogram data and their corresponding speech wave data from many speakers. Speech characteristics from any particular speaker are categorized and implicitly modeled by different speaker embeddings, a vector representation reflecting individual speech characteristics (speaker identity). In preparation for processes to be performed in the recovery processes, these different speaker embeddings are applied to generate the Mel-spectrogram of the speech, and produce output of speech waves corresponding to the corresponding speakers with similar embeddings. The conversion task from the Mel-spectrogram to speech wave can be carried out by applying neural vocoders such as Tacotron 2 or MelGAN. The speaker model is trained offline and the trained model can be any neural embedding model, i-vector, or other machine learning models. During the use of the wearable devices, the speaker representation of the current speaker is calculated from the mic speech when the SNR is higher than a certain threshold, and vibration signal together with mic speech when the SNR is low. A mapping from Mel-spectrogram of vibration sensors and a speaker representation to its Mel-spectrogram of microphone is trained with the same speaker during the adaptation phase. This mapper can be realized via deep learning models such as encoder and decoder of different types. The mapper typically separates the linguistic info and speaker info at the encoding stage, and replaces the speaker info to the corresponding full band representation (i.e., speech signal from mic, acronymed as FB) while keeping the linguistic info. At the decoding stage, the linguistic info and the target FB representation are combined to get the Mel-spectrogram for the subsequent text-to-speech (TTS) vocoders. The linguistic info may take the form of PDLs, such as PPGs, phonetic sequences, or other encoded features like Bottleneck features. This mapper can also be optimized during the adaptation phase.

As shown in FIGS. 2 and 3, during the recovery phase, the Mel-spectrogram of the vibration sensor signals is computed, and since the vibration sensors do not provide full band speech as the mic, it is called partial band (PB). Then, given the speaker representation retrieved from the speaker model, the vibration Mel-spectrogram is mapped to the mic speech Mel-spectrogram of the current speaker using the mapping model. Finally, taking the mic speech Mel-spectrogram as the input, the TTS synthesizer produces the speech waves.

In one embodiment, the wearable hosts include both the microphone and vibration sensors to perform event trigger detection and SNR calculation. Furthermore, the signals are transmitted to the mobile computing hub via wireless or wired connections depending on different configuration of the speech recovery systems. SNR is applied to decide which channels to be used for transmitting the signals to the hub, and the channels may be either the vibration sensors or the microphone sensors. In one particular embodiment, the speaker embedding and Mel-spectrogram calculation, the mapping of vibration sensor Mel-spectrogram to microphone sensor Mel-spectrogram, as well as the seq2seq conversion to speech waves can be performed in the hub or can also be carried out by a remotely connected cloud server.

Specifically, in FIG. 2, the process illustrated in Processing step 102A describes an offline training phase for a variant A (another embodiment) of the speech recovery process. It contains processing steps from 112A, 122A, 132A, 142A, 152A, 162A and 702A as indicated in the FIG. 2.

Processing step 112A is one or more microphones that sense acoustic waves and convert them into a sequence of digital signal values. It is typically an air conduction microphone. Processing step 112A is typically able to sense full band speech signals of 16 KHz or even wider ones at 22 KHz or 44 KHz.

Processing step 122A is a vibration sensor that senses the vibration signals on contact and converts them into a sequence of digital values. It is normally an accelerometer or a bone conduction sensor. Processing step 122A is typically only able to sense partial band signals (often below 5 KHz).

Processing step 112A and Processing step 122A sense the signals in a synchronized way with marked time stamps. They perform the same tasks as Processing step 112 and Processing step 122 but they receive time-synchronized signals from many speakers during this training phase. The time-synchronized vibration signals can be simulated by a mapping network trained from mic signals to vibration signals of a small parallel data set, when there is not enough parallel data for training.

Processing step 132A and Processing step 152A are the same feature extraction module as Processing step 130. However, they take input sequences of digital values from different sensors.

The input sequences are analyzed, and one or more sequences of feature vectors are produced. The output feature vectors can be Mel-spectrograms that contain speaker-dependent information. Specifically, Processing step 132A takes the input from the microphone and Processing step 152A takes the input from the vibration sensor. In addition, the output features may also include F0, and or voiced/unvoiced features.

Processing step 142A extracts speaker identity representation from the output signals of the Processing step 112A and Processing step 122A. The speaker identity can be represented by one or a combination of speaker embedding, i-vector, super vector, etc.

Processing step 702A is a model trainer that trains a neural network model (Processing step 175A) used for mapping from a speaker identity representation and partial band Mel-spectrogram to the full band signal representation of the same or very similar speaker. See FIG. 3 for detailed description of the encoding and decoding components in the processing step 175A and the related mapping processing step 705A.

Processing step 162A is a neural network model trainer that trains a mapping model taking the Mel-spectrogram of a speech signal as the input and producing its corresponding speech waveforms. The input to the processing step is Mel-spectrogram with speaker-dependent info. When the resulting model processing step 185A is trained, given the Mel-spectrogram of a speaker, the output speech wave signal is full band and sounds the speech from the same speaker.

For both processing step 702A and 162A, typically, their training data sets contain many different diverse speakers.

Specifically, in FIG. 2, the process illustrated in Processing step 105A describes an online phase for a variant A (another embodiment) of the speech recovery process. It contains processing steps as indicated in FIG. 2.

Processing step 115A is one or more microphones that sense acoustic waves and convert them into a sequence of digital values. It is typically an air conduction microphone. Processing step 115A is the same kind of mic as Processing step 112A for training.

Processing step 125A is a vibration sensor that senses the vibration signals on contact and converts them into a sequence of digital values. Processing step 125A is the same kind of vibration sensor as Processing step 122A for training. During the online recovery process, Processing step 125A only receives signals from the one who wears the device with the sensor.

Processing step 115A and processing step 125A sense the signals in a synchronized way with marked time stamps.

Processing step 145A extracts a speaker identity representation from the output signals of the Processing step 115A and Processing step 125A. The speaker identity can be represented by one or a combination of speaker embedding, i-vector, and super vector, in the same way as the processing step 142A.

Processing step 155A is the feature extraction module same as Processing step 152A and Processing step 130. It takes a sequence of digital values from the vibration sensor Processing step 125A, analyzes them, and produces one or more sequences of feature vectors. The feature vectors can be Mel-spectrograms that contain speaker-dependent information. In addition, it may also derive F0, and or voiced/unvoiced dynamic features.

Processing step 705A is a mapper that uses the trained model of Processing step 175A and takes the speaker id from Processing step 145A and the partial band (PB) Mel-spectrogram from Processing step 155A the input and generate the full band Mel-spectrogram of the same or very similar speaker as trained in processing step 702A. Details see Processing step 705A in FIG. 3.

Processing step 165A is a speech synthesizer (e.g., neural network sequence to sequence—seq2seq synthesizer) that takes the full band (FB) Mel-spectrogram with the same speaker voice characteristics from Processing step 705A as the input and produces its corresponding speech wave signal sequence, using the trained model Processing step 185A. The resulting speech wave signal is full band and sounds the speech by the same speaker. The Processing step can also be implemented by other vocoders, such as the Griffin-Lim algorithm after linearization.

In FIG. 3, Processing step 705A is a Mel-spectrogram mapper that contains the three components: one for the encoding processing step 715A (similar to Processing step 200 in Processing step 100), another for the decoding processing step 735A (similar to Processing step 700 in Processing step 100), and the third one for the processing step 725A (similar to Processing step 500). The first two can be realized using various neural networks for sequences, such as RNN, LSTM, CBHG, Transformer, and their variants, etc, while the third component can be done via a network or a linear function preferably at log scale. One may train the components independently or jointly with respective input and output as indicated in the Processing step 705A.

Processing step 705A in FIG. 3 provides a more detailed description of an online Mel-spectrogram mapper as indicated in FIG. 2.

Processing step 715A is a neural encoder that takes the partial band (PB) Mel-spectrogram from Processing step 155A and optionally a combined info from Processing step 145A (speaker identity info) and Processing step 175A (the component for encoding in the Mel-spectrogram mapping model) as its input, and produces a sequence of vector representation with speaker-independent linguistic info such as the PDL described before. The PB Mel-spectrogram from Processing step 155A collected from the vibration sensor(s) focuses on low frequency bins, while the info from Processing step 145A and Processing step 175A can supplement info in the higher frequency bins and subsequently provides a better precision in deriving the above mentioned linguistic info (PDL).

Processing step 725A adapts the PB speaker-dependent dynamic acoustic features, such as F0, VUV etc, to their full band correspondent features, which may make use of the speaker identity info from Processing step 145A and Mel-spectrogram from Processing step 175A. The detailed description of the adapter is given in FIG. 14.

Processing step 735A is a decoder that takes the speaker-independent linguistic info from the Processing step 715A, the speaker id from Processing step 145A, the Mel-spectrogram mapping model Processing step 175A (the component for decoding in the Mel-spectrogram mapping model), as well as the result from Processing step 725A as input, and generates the full band (FB) Mel-spectrogram that is then sent to the synthesizer to produce the speech wave signals of the same speaker.

The encoding and decoding components can be trained separately with different training data sets because the linguistic representation is speaker-independent, similar to PDLs in variant B. The key difference is that the output of the model is Mel-spectrogram.

FIG. 4 shows an embodiment of this invention implemented as variation type B to achieve the speech recovery when one source of the information is brainwave signals. The noise cancellation and speech recovery system utilizes brainwave sensors (such as EEG, ECOG, and N1) in combination with microphone or other vibration sensors. Furthermore, the speech recovery processes apply the speech of the particular user either recorded in the past or produced in real time as a reference speech to carry out the speech recovery. Specifically, when the sound vibration signals are available, one may establish a mapping among signals from brainwave, vibration and speech at a certain feature representation level, such as Mel-spectrogram, or MCEP. Under the circumstances, when the sound vibration signals are not available, one may train a model to convert the brainwave signals to intermediate representations, e.g., PDLs. A few seconds or minutes of speech from the person in the past or present can be used to derive the speaker id (e.g., embedding). This can be used to adapt the speech synthesizer in the same way as described before, e.g., at the level of MCEP or Mel-spectrogram. As a result, the speech wave generated during the communication will be similar to the sound of the device user.

Processing step 102B describes an offline training phase of another embodiment as variant B of the speech recovery process. It contains processing steps as indicated in FIG. 4.

Processing step 112B is one or more microphones that sense acoustic waves and convert them into a sequence of digital values. It is typically an air conduction microphone. Processing step 112B is able to sense a full band speech signal of 16 KHz, and even wider bands, e.g., 22 KHz. It can be the same as Processing step 112A and Processing step 115A.

Processing step 122B is a brainwave sensor that senses the brainwave signals and converts them into a sequence of digital values. Processing step 122B can be EEG, ECG, Neuralink N1 sensor, or other sensors that can detect and convert brainwaves.

Processing step 112B and processing step 122B sense the signals in a synchronized way with marked time stamps. Such paired signal sequences from thousands, tens of thousands, or even millions of speakers are collected during this offline training phase.

Processing step 132B is a decoder that converts from microphone signals to a sequence of a PDL vector representation, such as phonetic pieces or graphemes described before. This kind of linguistic info representation can be obtained by using any accurate speech recognition tech.

Processing step 142B is a module that computes speaker identification info such as speaker embedding, i-vector. It takes one or both inputs from Processing step 112B and Processing step 122B for computing the speaker id info. This can be implemented using an auto-encoder neural network, or i-vector.

Processing step 152B is a brainwave transcription module that converts brainwave signals to a sequence of MFCC features. This can be done by a neural network model to establish a mapping using a parallel data set of brainwave signals and speech signals collected simultaneously.

Processing step 202B takes the MFCC sequences from Processing step 152B with their corresponding time-synchronized PDL representation to train a neural network model that can be used to transcribe the MFCC sequences to the PDL representation. Processing step 175B is the generated model. The details of Processing step 202B is given in FIG. 9.

Processing step 162B is a sequence to sequence neural network synthesizer trainer. It trains a mapping model taking the PDLs and speaker-specific info (e.g., embedding) of a speech signal as its input and producing its corresponding speech wave signal sequence as its output. The PDL vector representation contains speaker-independent linguistic info while the speaker embedding encodes the speaker-dependent info. When the model is trained, the resulting speech wave signal sounds the speech from the same speaker as represented by the speaker embedding. The Processing step 162B is different Processing step 162A which takes the Mel-spectrogram as its input. Processing step 162B may be trained independently in two stages: stage 1 converts from PDLs to Mel-spectrogram and stage 2 from Mel-spectrogram to speech wave signal. These two steps can also be trained jointly.

Processing step 105B describes an online phase of another embodiment as variant B of the speech recovery process with a brainwave sensor and microphone(s) as its input. It contains processing steps as indicated in FIG. 4.

Processing step 115B is one or more microphones that sense acoustic waves and convert them into a sequence of digital values. It is typically an air conduction microphone. Processing step 115B is the same kind of microphone as Processing step 112B for training.

Processing step 125B is a brainwave sensor that senses the brainwave signals and converts them into a sequence of digital values. Processing step 125B can be EEG, ECG, Neuralink N1 sensor, or other sensors that can detect brainwaves. It is the same kind of sensor as Processing step 122B for training.

Processing step 115B and processing step 125B sense the signals in a synchronized way with marked time stamps in the same way as in training.

Processing step 145B extracts speaker identity representation (e.g., embedding) from the output signals of the Processing step 115B and Processing step 125B. The speaker identity can be represented by one or a combination of speaker embedding, i-vector, super vector, F0, and or voiced/unvoiced features.

Processing step 155B is a brainwave transcription module that converts brainwave signals to a sequence of MFCC features. This functions the same way as Processing step 152B with the same trained model.

Processing step 205B transcribes the MFCC sequences from Processing step 155B to the PDL vector representation using the model 175B generated by Processing step 202B in the training process of Processing step 102B.

Processing step 165B is a sequence to sequence neural network synthesizer that takes the linguistic info (e.g., PDL) from Processing step 205B and the speaker id info (e.g., speaker embedding) from Processing step 145B as the input, given the model 185B generated by Processing step 162B in the training process of Processing step 102B, and produces its corresponding speech wave signal sequence. The resulting speech wave signal from Processing step 165B will sound the same as the speaker represented by the speaker id info from Processing step 145B. This is different from Processing step 165A, which takes the Mel-spectrogram as the input. Processing step 165B may take a two stage approach with the first stage converting from PDLs to Mel-spectrogram and the second stage from Mel-spectrogram to speech wave signal, consistent with its training phase in processing step 102B.

Processing steps 162B, 165B and model 185B can be partially implemented by neural networks and integrated with other non-neural vocoders, such as the Griffin-Lim algorithm.

FIG. 5 shows a block diagram of the hardware (HW) system setup that includes key modules for a self-contained configuration. As shown in FIG. 5, the system is implemented with a wearable platform Processing step 304 to host the signal acquisition sensors (e.g., mic, vibration, brainwave), digital signal processors (DSP) for hosting trigger event detecting algorithms (processing step 302), and signal transmitter and receiver (processing step 306). The sensors are implemented to include those sensing units to acquire raw signals with background noises of different levels. Some of them (e.g., accelerometers) are very resistant to any normal noises. The trigger event detector on the DSP (processing step 302) is implemented to detect whether the user intends to talk to the system and to indicate whether it is in call-mode for human callers. In a preferred embodiment, transmission of signals is achieved by using the wired or wireless connection between wearable and mobile hubs, such as smart phones and smart watches.

Furthermore, the mobile computing hub platform (processing step 800) is implemented with features to indicate to the wearable platform whether it is in the call mode and to further process detected trigger word signals after it is detected by the triggering detector (processing step 302). Therefore, the mobile computing platform is able to adapt and recover signals transmitted from and to the wearable components and further able to pass the synthesized or processed signals via cellular network to the other communication parties. In addition to the system implementation as shown in FIG. 5, a cloud server may be incorporated to compute the base models and update the versions of the codes (processing step 905) for the speech recovering system as disclosed in the present invention.

The Processing step 800 is the computing hub, which may host a set of core processing components for speech recovery (Processing step 600) and speaker-dependent feature adaptation (Processing step 500). After the speech recovery process, the resulting recovered synthesized speech is sent to the cloud via cellular transmission processing step 805.

Processing step 803 has the functionality of exchanging the signal and info with processing step 306 in the wearable unit of processing step 300, while the Processing step 805 is responsible for info exchange via any cellular connection with the cloud of processing step 900. Processing step 805 is used to transfer recovered speech signals, as well as code and model updates, including any code and models in processing step 800 and processing step 300. If privacy is highly required, personal biometric info can be kept in this unit of processing step 800 without going to the cloud by using a certain type of configuration.

Specifically, when the computing hub is in a mode of communication with another person, conference call, or even automated service call, processing step 800 will tell the wearable unit of processing step 300 that it is in a call-on mode via processing step 803.

The Processing step 800 may also perform additional processing of the signals after the trigger detector alerts any event, which may include a further verification whether the event is indeed contained in the sent signals. This process takes place before the signals are sent to processing steps 500 and 600 for processing.

Processing step 900 complements the cellular network functionalities between the hub (Processing step 800) and the other parties with additional base model training (processing step 400) as well code and model updates (processing step 905).

Processing step 400 performs base model training, such as the models for the automatic speech recognition engine to obtain a linguistic representation (e.g., phonetic pieces) from the speech signals, the conversion from a linguistic representation to MCEP with speaker-dependent info in case the speech biometric is agreed to be placed on the cloud, and neural network speech synthesizer. The resulting models will be sent to the hub (processing step 800). Its detailed functionalities will be described in FIG. 9 and FIG. 10. The candidates for neural network synthesizer can be Tacotron. The synthesizer without additional models can be non-neural vocoder, such as STRAIGHT, WORLD and their variants.

Processing step 403 is a collection of models associated with the cloud based trainer of processing step 400. The models are passed down to processing step 800 as processing step 405 and are used for extracting certain features (as in processing step 152B, processing step 155B), extracting speaker-dependent identity representation (as for processing step 142A and processing step 145A, processing step 142B and processing step 145B,), transcribing signals into linguistic representations (for processing step 200 and processing step 715A, model 175B for processing step 205B), adapting speaker-dependent features (as for processing steps 725A and 735A, as model 175B for processing step 205B), and synthesizing personal speech (as model 185A for processing step 165B) in some cases.

Processing step 905 manages the code version update as well as downloading trained models of a proper version to Processing step 800 to be used by the corresponding modules.

FIG. 6 shows a system configuration of a lean hub configuration as another embodiment of this invention. As shown in FIG. 6, the system is implemented with a wearable platform to host the sensors, DSP for trigger detectors, and transmitter and receivers. The sensors implemented include those sensing devices to acquire raw signals with background noises. The trigger event detector on the DSP is implemented to detect whether the user intends to talk to the system and whether it is in call-mode for human callers. In a preferred embodiment, transmission of signals is achieved by using the wired or wireless connection between wearable and mobile hub, such as a smartphone.

Furthermore, the mobile computing hub platform can further process the trigger event signals transmitted from and to the wearable component and also to provide indications to the wearable hub whether it is in call mode. In addition, the system can pass the processed signals via cellular network to the cloud platform for further processing. The cloud platform of the system shown in FIG. 6 can be implemented with a cloud server to receive the signals via the cellular networks to train the base models and update the codes for the speech recovering, and to adapt and recover signals during the use for enrollment phase and in a call mode via adapters and recoverers.

When the wearable unit has a powerful computing capability, the functional modules in the mobile computing hub can be shifted to the wearable unit and in the extreme case, the wearable unit serves as the mobile computing hub as well.

When the wearable unit has a weak computing capability, certain functionalities in the wearable unit can be shifted to the mobile computing hub or even cloud. In an extreme case, the wearable unit may only host the functionality of signal collection and transmission.

The important sub-modules in FIG. 6 are the same as the ones in FIG. 5, and the processing step 300 remains the same for audio capturing from the sensors, event detection, and transmission. The key difference between FIG. 6 and FIG. 5 is that a few modules in processing step 800 are moved to processing step 900 so that the hub's main functionality is focused on passing the signals to the cloud. Consequently, processing step 800 and processing step 900 become processing step 800L and processing step 900L.

All modules in processing step 300 in FIG. 6 are the same as in FIG. 5. Modules represented by processing step 500 and processing step 600 together with their models (processing step 405) previously in processing step 800 of FIG. 5 are now located in the cloud processing step 900L. The resulting processing step 800L is much leaner compared with processing step 800.

Processing step 800L serves the purpose of transmitting the signals from the terminal processing step 300 and passing them to the cloud processing step 900L. It still maintains the mode info of the hub so that processing step 300 can behave accordingly.

Processing step 900L now takes the signals from processing step 300 via processing step 800L, and performs all the live adapting and recovery processes in addition to the base model training processing step 400 and the resulting models processing step 403, as well as version updating functions of processing step 905.

FIG. 7 is a system block diagram of another embodiment to illustrate an earbud-based speech recovery system architecture. This embodiment provides key modules to form a self-contained configuration with the earbuds functioning as the wearable host to incorporate sensors and DSP for trigger event detection to acquire, detect triggering events, and transmit signals. As shown in FIG. 7, wireless transmissions between the earbuds and a smartphone is achieved via the transmitter. The smartphone further processes the signals when triggering events are detected or it is an on-call mode. In the on-call mode, it adapts and recovers the signals transmitted between the wearable components and the smartphone. As shown in FIG. 7, the synthesized speech or processed signals may be transmitted via cellular network to the other communication parties. Furthermore, the cloud servers in the cellular networks are implemented to compute the base models and update the codes for the speech recovering and adapting devices and to adapt and recover signals. A simple mechanism may be used to allow the user to instruct the recovery system to bypass the speech recovery process and transmit the original signals to the other parties.

FIG. 7 is an embodiment of FIG. 5 where the processing step 300 is located on earbuds and subsequently renamed to processing step 300E, and processing step 800 is on smartphone or smartwatch that have cellular transmission capabilities. The hardware for processing step 300E has a design to allow accelerometers to sense ear bone vibrations when the speaker wearing the earbuds talks.

FIG. 8 is a system block diagram to illustrate another embodiment of this invention implemented with an earbud-based lean hub configuration. The system includes earbuds to host sensors and DSP for trigger event detection to acquire, detect triggering events, and transmit signals. The signals are transmitted between the earbuds and the smartphone wherein the smartphone further processes the trigger word signals transmitted between the wireless devices and the wearable components. The smartphone further provides indications to the wearable components whether the signal transmissions are taking place in a call mode. The smartphone can pass the synthesized or processed signals through the cellular networks to other communication parties. The system is further implemented with cloud servers to compute the base models and to update the converter and adapter codes in order to adapt and recover signals transmitted between the earbuds and the smartphone. The detected events can be a command to operate various functionalities in the wearable, smartphone, or cloud, such as setting up the configuration of the wearable, operating smartphone functions and apps, or even triggering a model updating action in the cloud.

FIG. 8 is an embodiment of FIG. 6 with earbuds hosting processing step 300E (as in FIG. 7) and smartphone or smart watch hosting processing step 800 (renamed as processing step 800EL). Similar to FIG. 7, processing step 300E is located on earbuds, and processing step 800EL is on smartphone or smartwatch that have cellular transmission capabilities.

The modules in different processing steps of FIG. 8 can be the same as the ones in FIG. 6. Some of the modules may be optimized to fit the hardware and software requirements by manufacturers.

As in FIG. 7, the hardware for processing step 300E has a design to allow accelerometers to sense ear bone vibrations when the speaker wearing the earbuds talks.

As a recap, based on the above descriptions and diagrams, the sequences of the data flow of the earbud-based system are described below. During a normal use in the on-call mode, the smartphone provides an indication to the earbuds that the communication process is operating in an on-call mode. Both microphones and accelerometers in earbuds receive raw signals, calculate the SNR and transmit them to the smartphone via wireless or wired connection, such as a Bluetooth connection. In the meantime, the smartphone receives the microphone and accelerometer signals as well as SNR values from earbuds. The recovery module in the phone recovers from raw signals to clean personal speech waves, and further sends to the other parties via cellular network. Alternatively, the phone may send the signals to the cloud where the recovery module recovers the personal clean speech signals from noise-contaminated signals.

On the other hand, when a normal operation of the communication system is in a trigger mode, i.e., the off-call mode, the signals from both microphones and accelerometers in earbuds are fed to the trigger event detection module continuously. In the meantime, the trigger event detection module in earbuds detects the trigger word event and the trigger module sends a detection signal to open the gates so that both microphone and accelerometer signals are transmitted to the smartphone via wireless connection, such as a Bluetooth connection. In one embodiment, the SNR value is also sent to the smartphone. The subsequent commands are then interpreted in the smartphone to perform corresponding functions according to the commands received.

Besides smartphones, smart watches may also serve as the mobile computing hub. A similar configuration can be made for the realization of the clear speech recovery.

In the embodiments described above, there are multiple phases of the system development and usage, and modes of operation.

Base Model Construction or Training Phase

The base model is constructed by collecting high quality clean speech from many speakers and speech from the previously described sensors.

The base model is trained in the servers in the Cloud or locally and downloaded into computing hubs, such as smartphones and smart watches.

- Any new version of the base model can also be downloaded from the servers to improve the system performance Enrollment (Adaptation) Phase

- It is for obtaining paired high quality clean speech from a particular speaker and modeling the mapping from the PDL representation and its corresponding acoustic speech representation (e.g., Mel-spectrogram, MCEP) under any quiet condition as measured by the SNR value (exceeding a certain threshold). Such high quality speech could also be sections in the offline recordings and the recognition of the speech sections into PDL are used to establish a mapping from the PDL to its corresponding acoustic speech representation.
- For earbuds related applications, both microphones and accelerometers in earbuds receive raw signals, calculate the SNR and transmit them to smartphone via wireless connection, such as Bluetooth
- The computing hub, such as smartphone, receives the microphone and accelerometer signals as well as SNR values from earbuds The adapters in the smartphone or in the cloud personalize the speech based on the base model downloaded from the servers in the cloud or locally.

During a Normal use in the On-Call Mode of Live Communication

- A computing hub, e.g., smartphone, gives an indication to the earbuds that it is in the on-call mode
- Both microphones and accelerometers in earbuds receive raw signals, calculate the SNR and transmit them to smartphone via wireless connection, such as Bluetooth Smartphone

- It receives the microphone and accelerometer signals as well as SNR values from earbuds, The recoverer module in the phone recovers from raw signals to clean speech waves of the speaker, and further sends to the other parties via cellular network. Alternatively, the phone may send the signals to the cloud where the recoverer module recovers the clean speech signals of the speaker from the noise-contaminated signals.

During a Normal use in the Trigger Mode (the Call Mode is Off)

- The signals from both microphones and accelerometers in earbuds are fed to the trigger module continuously
- The trigger module in earbuds detects the trigger word event
- The trigger module sends a detection signal to open the gates so that both microphone and accelerometer signals are transmitted to the smartphone via wireless connection, such as Bluetooth.
- In one embodiment, the SNR value is also sent to smartphone
- The subsequent commands are interpreted in smartphones and are used to operate the corresponding functions as defined. Some of the commands may be contained in the detected events.

An AEC (acoustic echo cancellation) module is normally included to remove the echo of the signals to the acoustic speakers in the earbuds (e.g., balanced armature) from the microphones and vibration sensors when there is an output sound signal coming from the other parties.

Corresponding to the hardware system setup in FIG. 8, the software process of the invention includes three major components that may be located in cloud, wearable, and computing hub.

Specifically, in one embodiment, the cloud-based offline training is to obtain a base model that generates an intermediate representation from speech features that provides intermediate probabilistic distribution of linguistic representations (PDL), e.g., Phonetic Posteriorgrams (PPG), encoded bottleneck features. The speech features are typically the features used in speech recognition, including MFCC (Mel-Frequency Cepstral Coefficients).

In one embodiment, the personal model adaptation process module trains the following models under a quiet condition and adapt them afterwards:

1) Mapping from PB PDL to FB MCEP (Mel Cepstral) models;
2) Mapping from PB Aperiodic, Voiced/Unvoiced to FB Aperiodic, Voiced/Unvoiced; and
3) Mapping from PB F0 to FB F0;

A real time application during the live communications is carried out when an event triggered by detected relevant signals for machine commands or signaled to carry out human communications by the mobile computing hub. The processes continue with recovery operations wherein the full band of clean speech waves of the speaker are recovered and generated from raw vibration signals and/or partially noisy mic signals.

In a semi-transparent mode when the speaker intends to provide reduced background sounds to the hearers, one may mix the background sounds of a reduced volume set by the earbud user with the synthesized speaker's voice. The background sounds are from microphones.

More generally for cases of live noise-removal tasks beyond earbuds when the front-end signal collection sensors contain microphones for near-field or far-field speech signals, one embodiment may use an accurate far-field automated speech recognition engine (FF-ASR) in noisy conditions and/or reverberant environment to obtain PDL from the speech of the intended speaker. The FF-ASR makes use of various noise-cancellation techniques, including beamforming, reverberation removal, etc, coupled with multiple speech channels or recordings via microphone arrays. The FF-ASR translates the speaker's voice into PDL, which is then converted by the rest of the system to a clean voice of the same speaker for various live communication, such as Zoom and Google Meet. Similarly, for offline noise-removal of speech recordings, one embodiment may follow the same process. In all these applications, the clean speech samples of the speaker intended for noise removal can be collected anytime when his or her signals are clean as measured by SNR values. When multiple speakers are present, a speaker identification module can be used to segment the speech stream or recording into sections where a single speaker is present. Clean speech can also be retrieved as described in variant A for noise removal, and close matching speaker embeddings can be obtained with short speech segments from the live streams or offline recordings.

FIG. 9 shows the software diagram with a cloud-based speaker independent (SI) PDL model trainer.

According to the cloud based system as shown, the cloud-based training processes may be carried out by first providing a set of speech training data with transcription and a high quality speech recognition trainer, such as Kaldi. The speech recognition system is then trained offline with speech data from many speakers, and augmented with the speech data from the user. In case of earbuds related embodiments, the speech data are mostly collected from the vibration sensors. An intermediate acoustic model and decoder is generated from the trained speech recognition system to generate an intermediate linguistic representation given the speech features in data collected from many speakers for training the speech recognition system. The input representation for the acoustic model includes MFCC (Mel-Frequency Cepstral Coefficients) and output intermediate representations focus on speaker-independent linguistic content, e.g., Phonetic Pieces, Phonetic Posteriorgrams (PPG), Graphemes, or encoded bottleneck features, instead of speaker-dependent characteristics.

The processing step 400 in FIG. 9 is about training a speaker-independent intermediate linguistic representation model of processing step 270, as an embodiment of SI-PDL model for PDL model decoder (processing step 200) in FIG. 1. Specifically,

- Given a set of training data with transcription and a high quality speech recognition trainer, such as Kaldi
- The speech data can be obtained from microphones, vibration sensors, or a mix of these sensors. The speech data uses vibration data for the same configuration in FIG. 10. The mix of the training data may depend on the SNR for the setups in FIG. 11 and FIG. 12.

Train an entire speech recognition system on speech data processing step 412 with many speakers offline. The training may start with speech data from microphones, and get adapted by vibration sensor data. The speech data is processed by processing step 415 to get features, such as MFCC, which may be mixed full and partial frequency bands (MB). Speech data from the user of the system is augmented when available. The features are then trained by processing step 420 based on the linguistic model Processing step 440 converted from annotated speech data, lexical data, and textual data. The linguistic model Processing step 440 returns a PDL representation of the references in the annotated speech data. As the result of the training, the SI-PDL model processing step 270 is produced.

FIG. 10 is a software system diagram that shows a MCEP Base Model Trainer under a quiet condition. The training module may be located in the hub or in the cloud and may be applied during a quiet condition according to a preset signal to noise ratio (SNR). The high quality clean speech signals from the microphone are first inputted into the training module followed by the processes of computing MCEP features using the feature extraction module and obtaining the full band MCEP features per frame. The MCEP feature sequence is then used as the target (output) signals. Meantime, the training module takes the signal from another sensor, such as an accelerometer, and extracts speech features, such as MFCC, as input signals. Then the MCEP trainer takes the input and output signals and trains a deep learning model. This phase is called the enrollment phase or adaptation phase depending on whether it is the first use by the speaker. The adaptation can happen anytime when the environment meets the condition of required quietness using a measure, such as SNR.

This trainer of processing step 750 is used during both the base model training phase and the enrollment phase. During the base model training, the high quality clean speech training data may contain many different speakers or speakers of similar voices, while during the enrollment phase, only the speech data from the user of the system is used to ensure that the resulting speech sounds like the speaker. It may be located in the hub or in the cloud with the training data of aligned acoustic and vibration signals collected during the adaptation phase.

This trainer of processing step 750 is used in a quiet condition as indicated by the SNR value, for example, higher than 20 dB. The SNR estimation is given in processing step 302 of FIG. 15. It takes the speech signal from the microphone, computes MCEP features using the feature extraction module of processing step 755, and obtains the full band MCEP features per frame. The MCEP feature sequence is used as the target (output) signals for trainer processing step 760 At the same time, it takes the aligned (synchronized) signal from another sensor, such as accelerometer, extracts per frame speech features, such as MFCC, in processing step 415 as input signals for trainer processing step 760.

The MCEP trainer processing step 760 may be realized via an architecture of one or multiple layer of LSTMs or transformers with the above input and output and produce a corresponding model processing step 770

One may have a similar procedure for trainer 705A to get Mel-Spectrogram model Processing step 175A FIG. 11 is a software system diagram that shows a MCEP Adapter (pre-PDL decoder). The adapter module may be located in the hub or in the cloud. The adapter is implemented as a personal model adapter that adapts the MCEP base models under different noisy conditions. The adapter is applied based on the assumptions that the base mapping model from combined band (CB) PDL to FB MCEP is trained. The processes of combination or integration of the features are performed before the PDL decoder (pre-PDL decoder). In applying the adapting processes, the noisy adaptation data may come from two different scenarios that include noises collected (offline or online) and added with known SNR or the signals obtained from real time microphones under noisy conditions and its real time estimated SNR comes from the module in the wearable hub. In this case, the decoding model SI-PDL to produce CB PDLs needs to be adapted with various additional noise-added data of known SNR for better performance on top of the basic SI-PDL training process described in FIG. 9.

This module Processing step 750PR is one embodiment of the MCEP adapter that takes the input from both accelerometer and microphones and combines them based on the SNR value before sending to the SI PDL decoder (recognizer). It is used for the enhanced enrollment phase. It may be located either in the hub or in the cloud, and trained offline or online in real time.

During the enhanced enrollment mode, the combined output full band MFCC (FB MFCC) and partial band MFCC (PB MFCC) from the duplicated two Processing step 415 are combined in Processing step 780PR based on SNR level to obtain better features as input to the Processing step 200 (SI PDL decoder) for a more accurately recognized PDL representation (CB PDL). Noises from different scenarios, such as street, cafe, room, news broadcast, music playing, and in-car, are collected offline or in real time use when the speaker is not talking nor in the on-call mode. The noises are added to the speech from microphones with known SNR.

The combiner (Processing step 780PR) may combine both FB MFCC and PB MFCC values linearly or in other function with the weight as a function of SNR: the higher SNR value is given, the heavier weight on FB MFCC (the channel with added noises) will be used. One may even train a neural network for better PDL recognition results. As a result the Processing step 270PR (SI PDL model) can be improved.

When more accurate PDL output from Processing step 200 is used as input to MCEP model trainer (the Processing step 760), the MCEP model (Processing step 770PR) is better trained.

FIG. 12 is a software system diagram that shows a MCEP Adapter (post-PDL decoder). The adapter module may be located in the hub or in the cloud. The adapter is implemented as a personal model adapter that trains the following models under a quiet condition and adapts them afterwards. The adapter is applied based on the assumptions of the trained base mapping model from CB PDL to FB MCEP. The adaptation network structure is implemented to add and train the first layers (combiner) and keep the rest layers in the MCEP base model. This is performed post PDL decoder. The functions of this module are similar to FIG. 11, and the noisy training signal data may come from either offline-added ones or the real time collected. For better performance, the SI PDL model needs to be adapted with the vibration sensor data, accommodating PB MFCC as its input, on top of the basic SI-PDL training process described in FIG. 9.

This module Processing step 750PS is another embodiment of the adapter that takes the input from both accelerometer and microphones sends to two duplicated SI PDL decoders (i.e., the two processing steps 200) with respective models (processing step 270PS for the noise-added microphone channel, and processing step 270 for the vibration sensor channel). Their PDL results are combined in processing step 780PS and sent to the MCEP trainer (Processing step 760) for adaptation, resulting in a better MCEP model (Processing step 770PS). It may be located either in the hub or in the cloud, and trained offline or online in real time.

During the enhanced enrollment mode, the output full band MFCC (FB MFCC) and partial band MFCC (PB MFCC) from the two identical processing steps 415 are sent to the two identical processing steps 200 with their respective models: processing step 270PS for FB MFCC, and processing step 270 for PB MFCC. Their results are combined by PDL combiner (Processing step 780PS) based on SNR level for a more accurately recognized PDL representation (CB PDL), similar to the Pre-PDL version. The noises are collected and added to the speech from microphones just like in FIG. 11 (Processing step 750PR).

The PDL combiner (Processing step 780PS) may combine both FB PDL and PB PDL values linearly or in other function with the weight as a function of SNR with normalization to the probabilistic distribution: the higher SNR value is given, the heavier weight on FB PDL (the channel with added noises) will be used. Alternatively, one may also train a neural network for obtaining better PDL recognition results (CB PDL).

When more accurate PDL output from Processing step 780PS is used as input to MCEP model trainer (the Processing step 760), the MCEP model (Processing step 770PS) is better trained.

FIG. 13 is a software system diagram that shows F0, AP, VUV Model Adapters and other speaker related features. The adaptation models of speaker specific dynamic features such as F0, AP, VUV are trained by using features from the vibration channels as input and their corresponding features from the microphone channels as the output during enrollment phase or adaptation phase when the acoustic environment meets the quietness condition. The vibration sensors may be implemented with accelerometers. The training of adaptation models can be performed when the estimated SNR level received from the wearable module is high.

The processing step 500 takes the paired output from processing step 130 and processing step 150, and establishes the mapping of the features from the partial band to the full band.

As one embodiment, the F0 adapter takes log of F0 from processing step 130 and log of F0 from processing step 150 of the corresponding frames at time t, and computes their means and variances of the respective log(F0) values from the same set of speech. Given X(t), the log(F0) of a new frame at time t from the partial band signal, and Y(t), the log(F0) of its corresponding frame from the full band signal, is estimated as:

$$Y(t)=(X(t)-u(X))*d(Y)/d(X)+u(Y),$$

where u(X) and d(X) are the means and variances of the log(F0) from the partial band signals, respectively; and u(Y) and d(Y) are the means and variances of the log(F0) of the corresponding full band signals.

Alternatively, this adapter can also be estimated by one or more layer neural networks with X as the input and Y as the output.

One embodiment of the VUV adapter may use a threshold of the probability of being a voiced or unvoiced frame for the partial band and full band signals, and establish a similar mapping. In addition, the mapping may use the neighboring PDL info. In one embodiment, the per-frame probability calculation can be made based on the power of the signals as well as the zero-crossing rate.

One embodiment of the AP adapter may use AP value distributions of the partial band and full band signals to obtain a scaling function or neural network for the mapping from partial to full band values.

These mappings form the adapter models of processing step 502.

Processing step 725A is almost the same as processing step 500 without the AP mapping.

FIG. 14 is a software system diagram that shows a speaker-specific feature adaptation module. The adapter is implemented to adapt speaker-specific features, such as F0, AP, VUV from the vibration channels to their corresponding features as in the microphone channels. This configuration incorporates different SNR levels in the adaptation model training so that the adaptation models can make use of the mic speech of different noise levels during the recovering process, instead of the case when only vibration signals are used when SNR is low as in FIG. 13. The vibration channels may include vibration detected from the accelerometer, and the adaptation may be performed, considering different SNR estimated by the wearable unit.

As another embodiment of Processing step 500, each adapter in Processing step 500S takes SNR as an additional input. The effect of the SNR values on each mapping in the model Processing step 502S depends on how robust the accelerometer is against the noise of different levels. For each mapping in Processing step 500S, one may train a neural network with SNR as its additional input and fine-tune the network. In real time use, the SNR value is estimated in the module described in Processing step 302 of FIG. 15.

FIG. 15 is a software system diagram that shows the real time sequence of processes for an event trigger detection and SNR computation during a live communication implemented on the wearable unit. The processes include a detection of relevant signals for voice commands to activate certain machine functions. An on-call signal is received from the mobile computing unit to indicate a communication mode to speak to another person or a group of people. During the on-call mode, depending on the values of the SNR, either the FB signals or the PB signals are passed to the mobile computing unit. The SNR level is estimated by using the speech boundaries indicated from accelerometer or other vibration sensors on the wearable devices according the following equation:

$$SNR=10*\log_{10} p(\text{speech})-10*\log_{10} p(\text{non-speech})$$

Where p(x) is the averaged power of signal x

Processing step 302 is an event trigger that detects the speech by the speaker wearing the device and decides: whether the speaker gives a voice command, or which SNR gated-signal to be sent to the computing hub. It is used during live communication in real time applications.

Processing step 3021 and processing step 3022 are feature extractors used for computing the SNR (processing step 3023) as well as trigger word detection (processing step 3024). Processing step 3021 extracts features from microphone(s), including signal energy level per frame for SNR computation as well as MFCCs and others for trigger word detection. Processing step 3022 extracts features from the accelerometers, including whether the speaker is talking or not talking in the current frame, as well as MFCCs and others for trigger word detection.

Processing step 3023 estimates the SNR as: $(E_{tt}-E_n)/E_n$, where $E_{tt}$ is the energy while the speaker is talking, and $E_n$ the energy while not talking, over one or more frames.

Processing step 3024 may be a deep learning model that detects the trigger word with the output from processing step 3021, processing step 3022, and the SNR value when the state is "off-call" from processing step 3025. If a voice command is detected, the command is returned and passed to the computing hub.

Processing step 3025 keeps track of the status from the computing hub: whether it is "on-call" or "off-call", and communicates it to the other components in the Processing step 302 to decide which signal to pass to the hub. When the state is the on-call mode, if the SNR value is higher than a pre-set threshold, the microphone signal is sent out; if the SNR is below a pre-set threshold, the accelerometer signal is sent. The "on-call" state is when the speaker is talking to another person over the phone. The "off-call" state is when the speaker is not talking to anyone over the phone, but issuing a command to the computing hub, such as the phone, smart watch, or other wearables.

FIG. 16 is a software system diagram that shows the real time sequence of processes for an event trigger detection and SNR computation during a live communication for the continuously (integrated) adaptive recovering process, and Processing step 3020 is a variant of Processing step 302 in FIG. 15. The processes have a keyword detector for detecting a keyword trained in a deep learning model or other machine learning method, and SNR computing component. The triggering and detecting processes look for voice commands in the signals (to activate certain machine functions) when on-call mode is off, or compute SNR values when informed by the mobile computing hub to be in a mode of communicating with another person (or a group of people), i.e., on-call mode. The SNR level is estimated by using the same equation as described above and the SNR value is passed to the subsequent phases of the SNR-sensitive adaptation and conversions, together with both FB signals and PB signals from their respective sensors.

Processing step 3020 is another embodiment of the event trigger processing step 302 coupling with processing step 750PR (in FIG. 11) and processing step 750PS (in FIG. 12). The key difference is that instead of making a decision which channel of the signals to be sent to the computing hub, it sends signal streams from both microphone and accelerometer channels as well as the estimated SNR to the computing hub.

Processing steps 3021, 3022, 3023, and 3024 have the same functionalities as their counterpart modules in processing step 302. Processing step 30250 is similar to processing step 3025 as it keeps track of the status from the computing hub and when the state is "off-call" it runs processing step 3024 to detect and send voice commands (VC) to the hub. However, when the state is "on-call", it sends signals from both microphone(s) and accelerometer as well as the estimated SNR to the computing hub.

FIG. 17 is a software system diagram that shows the recoverer software module to function as the base recoverer. The module can be located either in the hub or in the cloud for recovering high quality clean speech of the speaker from a noisy speech of that person with important personal speech characteristics preserved. For a real time application, the module is activated by a signal in an on-call mode to communicate with another person or a group of people and the SNR is low. The SNR estimator in the wearable unit is calculated and used as the gate to take two different alternate actions.

1) If SNR is greater than a pre-set threshold, pass the microphone signals directly to the transmission channel bypassing the recoverer module, or
2) If SNR is less than nor equal to the threshold, pass the vibration signals to the base recoverer module for a further processing Therefore, with the functionality of the recoverer, clean personal speech signals are recovered from the signals received from vibration sensors if the SNR is less than nor equal to a thresholded SNR value. When the signals are passed to the recoverer, they go through multiple steps: the feature extraction component for obtaining PB features, such as MFCC; the PDL decoder for obtaining an intermediate representation of mostly linguistic content, such as PB PDLs; the MCEP decoder that mapps the intermediate representation to a FB MCEP sequence; and finally the vocoder which takes the speaker dependent features adapted from the output of the feature extraction component, e.g., F0, AP, Voiced/Unvoiced indicator, and the FB MCEP to synthesize a personal speech wave.

The base recoverer module (processing step 600) recovers the clean speech in real time given the speech signal from the same speaker via the accelerometer, regardless how noisy the speaking environment is. This module can be located either in the hub or in the cloud.

The base module processing step 600 is coupled with processing step 302 in FIG. 15. When it is in "on-call" mode and SNR is below a given threshold, the speech signal comes from the accelerometer (SNR-gated).

The processing steps 150, 200, 700, and 160 are the same as the ones described in processing step 100 (FIG. 1), and models 270 and 770 are the respective ones for processing step 200 and processing step 700. The processing steps 500F and 500V are sub-components of processing step 500, and 502F and 502V are their respective mapping models.

FIG. 18 is a software system diagram that shows the functional processes of a pre-PDL integration of the adaptive recoverer, a variant of FIG. 17. The module can be located either in the hub or in the cloud and this module is coupled with $II_b$ of FIG. 11, $III_{b,c}$ of FIG. 14, and $IV_{b,c}$ of FIG. 16. In real time operations during live communications, the module is activated in an on-call mode to communicate with another person or group of people. The recoverer is applied in the system of this invention to recover high quality clean personal speech signals from the raw signals from vibration sensors, microphones, as well as SNR. When the signals from both microphones and vibration sensors are passed to the recoverer together with the real time SNR values, they go through the following steps: the feature extraction components for obtaining PB and FB features, such as PB and FB MFCCs; then the PB and FB features are combined given the current SNR value in the combiner; the combined PB and FB features are sent to the PDL decoder to obtain the CB PDLs; the CB PDLs are then sent to MCEP decoder to obtain FB MCEPs; and finally, the vocoder which takes the speaker dependent features adapted from the output of the feature extraction component, e.g., F0, AP, Voiced/Unvoiced indicator, and the FB MCEP to synthesize a speech wave of the speaker. The PDL model used here needs to be adapted from the base SI-PDL training process described in FIG. 9 with combined features as input.

This Pre-PDL recovery module processing step 600PR performs the same functionality as processing step 600, taking additional SNR info and speech signal from the microphone(s) for more accurate PDL decoding so that it may make the use of the speech signal from microphone(s) when SNR is not too low, instead of making a binary thresholded decision.

This module processing step 600PR couples with the pre-PDL MCEP adapter (processing step 750PR in FIG. 11 to obtain 770PR), the adapters for F0, AP, VUV, etc (processing step 500S, the combination of processing step 500SF and processing step 500SV with their respective models of processing step 502SF and processing step 502SV), and the event trigger with SNR (processing step 3020). It uses the same modules processing steps 200, 700, and 160 for PDL model decoder, MCEP decoder, and Vocoder, respectively. On the other hand, processing steps 415 and 780PR are the same as in processing step 750PR (during the adaptation phase): the two modules of processing step 415 extract respective features given the signals from microphone(s) and accelerometer, and the module of processing step 780PR combines the extracted MFCC features. The microphone signals to processing step 415 has background noises mixed in with an estimated SNR using the module processing step 3023 in FIG. 16. This module processing step 600PR can be located either in the hub or in the cloud. Its operating condition is the same as processing step 600.

FIG. 19 is a software system diagram that shows the functional processes of a post-PDL integration of the adaptive converter, a variant of FIG. 17. The module can be located either in the hub or in the cloud and this module is coupled with $II_c$ of FIG. 12, $III_{b,c}$ of FIG. 14, and $IV_{b,c}$ of FIG. 16. In real time operations during live communications, the module is activated in an on-call mode to communicate with another person or group of people. The recoverer is applied in the system of this invention to recover clean personal speech wave signals from the input obtained from vibration sensors & microphones, as well as derived SNR. When the signals from both microphones and vibration sensors are passed to the recoverer together with the real time SNR values, they go through the following steps: the feature extraction component for obtaining PB and FB features, such as PB and FB MFCCs; then the PB and FB features are sent to their respective PDL decoders to obtain PB and FB PDLs; given the current SNR value, the PB and FB PDLs are combined to form the CB PDLs which are sent to MCEP decoder to obtain FB MCEPs; and finally, the vocoder which takes the speaker dependent features adapted from the output of the feature extraction component, e.g., F0, AP, Voiced/Unvoiced indicator, and the FB MCEP to synthesize a speech wave of the speaker. The PDL model used for PB features from the vibration sensors needs to be adapted from the base SI-PDL training process described in FIG. 9 with PB features as input.

For the purpose of providing technical references, the following is reference information for microphones and vibration sensors. Namely, for microphones, there are MEM microphones, and piezoelectric sensors, and for vibration sensors there are accelerometers, laser based vibration sensors and fiber optical vibration sensors, and for brainwave sensors, there are NI sensors from Neuralink and Electroencephalography (EEG) that can be implemented in the systems of this invention.

Although the present invention has been described in terms of the presently preferred embodiment, it is to be understood that such disclosure is not to be interpreted as limiting. For example, though the conductivity types in the examples above often show an n-channel device, the invention can also be applied to p-channel devices by reversing the polarities of the conductivity types. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A speech recovery system implemented with a noise cancellation apparatus comprising:

a vibration sensor and a microphone for receiving and transmitting voice signals as incoming speeches from a speaker; and the vibration sensor and the noise cancellation apparatus further includes a speaker identity extracting module for extracting speaker identity representations from the incoming speeches as a referencing identity representation from the incoming speeches from the speaker;

the vibration sensor further generates vibration signals corresponding to the voice signals without being affected by environmental noise signals for applying the vibration signals as reference signals for cancelling the environmental noise signals;

wherein the speaker identity extracting module further applies signals from the vibration sensor and the microphone for extracting and applying the speaker identity representations into linguistic representations to synthesize clear full band high quality personal speech with same linguistic content and same speaker characteristics as the incoming speeches from the speaker;

the noise cancellation apparatus further applies a SNR value to determine a value of quietness of acoustic environment form selecting proper vibration sensor and microphone sensor signals to convert the signals from one or a combination of both channels to a probabilistic distribution of linguistic (PDL) and converting the PDL and speaker identity representation to the speaker's microphone quality speech; and the noise cancellation apparatus further applies a SNR value to determine a value of quietness of acoustic environment for selecting proper vibration sensor and microphone sensor signals to convert the signals form one or a combination of both channels to the partial band PDL and the vibration sensor and a microphone sensor channel further applies a corresponding neural network model for converting a full band PDL, wherein a partial band PDL is converted from signals received from the vibration and the full band PDL is converted form signals from the microphone.

2. The speech recovery system implemented with a noise cancellation apparatus of claim 1 wherein:

the vibration sensor includes a MEMS device comprising piezoelectric accelerometers for installation in earbuds as a wearable apparatus.

3. The speech recovery system implemented with a noise cancellation apparatus of claim 1 wherein:

the vibration sensor includes a MEMS device comprising piezoelectric accelerometers for installation in necklaces as a wearable apparatus.

4. The speech recovery system implemented with a noise cancellation apparatus of claim 1 wherein:

the vibration sensor includes a MEMS device comprising piezoelectric accelerometers for installation in patches directly on an upper body for detecting vibrations.

5. The speech recovery system implemented with a noise cancellation apparatus of claim 1 wherein:

the vibration sensor further includes a laser-based vibration sensor for detecting and sensing a non-contact vibration.

6. The speech recovery system implemented with a noise cancellation apparatus of claim 1 further comprising:

a wireless transmitter/receiver to transmit and receive wireless signals.

7. The speech recovery system implemented with a noise cancellation apparatus of claim 1 wherein:

the speaker identity extracting module further comprises a converter for applying a rapid adapted conversion functional module to convert the voice signals and vibration signals to probabilistic distribution of linguistic representation sequences (PDLs) and wherein the noise cancellation apparatus further comprises a mapping module that is first developed and trained in an adaptation phase for mapping the PDL into a full band MCEP sequence.

8. The speech recovery system implemented with a noise cancellation apparatus of claim 7 wherein:

the speaker identity extracting module further comprises a converter for applying a rapid adapted conversion model to convert the voice signals detected by the vibration sensor to probabilistic distribution of linguistic representation sequences (PDLs).

9. The speech recovery system implemented with a noise cancellation apparatus of claim 7 wherein:

the speaker identity extracting module further comprises a converter for applying a rapidly adapted conversion model to convert the voice signals detected by the microphone to probabilistic distribution of linguistic representation sequences (PDL).

10. The speech recovery system implemented with a noise cancellation apparatus of claim 1 wherein:

the speaker identity extracting module includes a plurality of brainwave sensors for mounting on a speaker's head for sensing signals from the speaker's head to convert the signals from the speaker head to the speaker identity representations.

11. The speech recovery system implemented with a noise cancellation apparatus of claim 1 wherein:

the speaker identity extracting module is further implemented by applying a speaker embedding an i-victor process for mapping speaker independent linguistic representations to a speaker dependent mel-spetrogram.

12. The speech recovery system implemented with a noise cancellation apparatus of claim 1 wherein:

the microphone further has a reduced volume channel for receiving and detecting background sounds to mix with a synthesized speaker voice based on a setting of a user's earbud when setting on a semi-transparent mode for reducing background sounds generated at a speaker side.

13. The speech recovery system implemented with a noise cancellation apparatus of claim 1 further comparing:

adaptive rubber buds for implementing active noise cancellation algorithms for generating a background blocking mode to block background sounds receivable by other communication parties.

14. The speech recovery system implemented with a noise cancellation apparatus of claim 1 further comprising:

a far-field automatic speech recognizer (FF-ASR) fort translating the incoming speeches from a speaker into PDL for converting to a clean voice of the speaker in various implementations of various live communication applications.

15. The speech recovery system implemented with a noise cancellation apparatus of claim 13 wherein:

the FF-ASR further implements various noise-cancellation techniques, including beamforming, reverberation removal, coupled with multiple speech channels or recordings via microphone arrays.

* * * * *